United States Patent [19]
Denney

[11] 3,801,466
[45] Apr. 2, 1974

[54] URIC ACID ASSAY AND REAGENTS THEREFOR

[75] Inventor: Jerry W. Denney, Carmel, Ind.

[73] Assignee: American Monitor Corporation, Indianapolis, Ind.

[22] Filed: Dec. 2, 1971

[21] Appl. No.: 204,333

[52] U.S. Cl.......... 195/103.5 R, 23/230 B, 252/408
[51] Int. Cl...................... G01n 33/16, G01n 31/14
[58] Field of Search.............. 23/230 B, 230 R, 253; 195/103.5; 252/408

[56] References Cited
UNITED STATES PATENTS

| | | | |
|---|---|---|---|
| 3,335,069 | 8/1967 | Wachter | 23/230 B |
| 3,415,627 | 12/1968 | Rait | 23/253 |
| 3,493,346 | 2/1970 | Hughes | 23/230 B |
| 3,528,777 | 9/1970 | Moran | 23/230 B |
| 3,649,198 | 3/1972 | Rush | 23/230 B |

Primary Examiner—Morris O. Wolk
Assistant Examiner—R. E. Serwin
Attorney, Agent, or Firm—Robert A. Spray

[57] ABSTRACT

A colorimetric assay for uric acid, the assay being of a type which uses uricase to eliminate the uric acid in a blank test so that its specific effect can be detected by comparison with a specimen not having the uric acid effect eliminated, in which a buffer is used in both the test and the blank steps, thus avoiding the extra expense and error of protein-precipitation steps and other steps or other disadvantages of prior methods.

4 Claims, No Drawings

URIC ACID ASSAY AND REAGENTS THEREFOR

NATURE AND SIGNIFICANCE OF URIC ACID ASSAYS

The quantitative assay of uric acid in blood serum is very useful in diagnosing and observing the course of variety of disease states, even though uric acid is a waste product, derived from purines of the diet and those synthesized by the body. The healthy human body contains about 1.1 gm of uric acid, only about one-sixth of which is present in the blood, the remainder being in other tissues. It is the measurement of the very small amount of the uric acid which is present in the blood, which is the subject of this invention.

Uric acid is filtered from the blood by the kidneys, the normal excretion of uric acid in the urine being from 250 to 750 mg. per 24 hours. The amount or level of uric acid in the urine is important in diagnosing and evaluating kidney diseases, for a variety of kidney diseases affect the amount of uric acid excreted. The amount of uric acid in urine gives an index of the amount of purines being metabolized, and the comparison of uric acid levels in blood serum and urine levels gives information useful in differentiating a variety of diseases affecting purine metabolism or kidney function.

Normal levels or quantities of uric acid are less than 6.5 mg per 100 ml of blood serum. The low amount or proportion of uric acid is emphasized by noting that its usual amount is only in the order of one-tenth that of other body substances, such as glucose, which are assayed for diagnostic purposes.

In gout, quantities of uric acid in serum are frequently considerably elevated in proportion to that of normal specimens, yet the uric acid is not much higher than normal specimens when consideration is taken of the total volume of blood, the uric acid quantity in cases of gout being frequently between 6.5 and 10 mg/100 ml of blood serum. The success of treatment of gout is often evaluated by measuring uric acid, and noting even relatively small increments of change, for the level of uric acid declines with clinical improvement. Serum acid levels are also increased, with corresponding diagnostic significance, whenever there is increased metabolism of nucleoproteins, such as in leukemia and polycythemia.

Diagnostic utility of uric acid assays is further manifest by the fact that increased uric acid levels are a diagnostic finding in familial idiopathic hyperuricemia. Elevated blood serum uric acid levels are also a diagnostic indicator of decreased kidney function. In severe kidney impairment, values of uric acid up to 20 to 35 mg/100 ml of blood serum have been observed; and while accuracy of uric acid assay is important in these severe cases, accuracy of the uric acid assay is even more precisely demanding in conditions involving borderline or low grade kidney impairment which exhibits only small changes of uric acid level in comparison to normal specimens.

Accurate measurement of uric acid is demanding and difficult, since there are many substances in blood serum and urine which may be mistaken for uric acid in common assay methods; and if a mistakenly high value for uric acid is reported, the patient may be mistakenly placed on costly, potentially dangerous, and/or uncomfortable therapy.

For instance, if a patient has a high level of serum ascorbic acid, an abnormally high uric acid value will be obtained by commonly used assay methods. This problem is compounded by the fact that even repeated assays to confirm the diagnosis will give erroneous results.

In addition to substances normally found in varying degrees in serum which may be mistakenly measured as uric acid, there are a number of substances in the diet or which are used as drugs which may interfere; for example, caffein from caffein beverages and gentisic acid, which is formed in the body from ingestion of aspirin, are commonly mistakenly measured as uric acid in prior art assay methods. Vitamin C when taken by the patient greatly elevates serum ascorbic acid levels, and this may be mistakenly measured as uric acid.

If other substances of blood serum or urine are measured as uric acid, the upper limit value of normal uric acid reported by the laboratory (which is set by the determination of uric acid in conjunction with those other substances in testing a number of apparently healthy individuals) will be too high; and consequently, an individual who happens to have a low level of those interfering substances but a supranormal level of uric acid (due to disease processes such as mentioned above) might have an apparent uric acid value which, even though itself of a high value which would indicate a disease situation, falls within the range considered normal by that technique, and thus his disease would go undetected.

PRIOR ART

In 1894 Offer[1] reported that uric acid in alkaline solution with phosphotungstic acid produces a blue color or chromophore. Application of the phosphotungstic acid reaction method directly to urine and protein-free filtrates was introduced by Benedict[2] in 1922 and modified by Folin[3] in 1930. Later modifications in these methods were made to improve linearity and to remove turbidity. Such methods suffer from the fact that they lack specificity in measurement of uric acid, since other substances or chromogens than uric acid which are found in serum (such as ergothioneine, glutathione, ascorbic acid, glucose, tyrosine, tryptophan, cystine, cysteine caffein, and gentisic acid, and a variety of phenolic compounds) also react to give a blue color which may be falsely interpreted as originating from the uric acid chromogen. Furthermore, protein precipitation and removal is necessary to prevent chromophore formation from the protein itself, and the consequent gross error, and to prevent the formation of gross turbidity from the interaction of protein with subsequently used reagents. Such manipulation is time-consuming.

In an effort to obtain adequate specificity in the measurement of uric acid in blood serum, Bulger and Johns[4] in 1941 introduced the use of the highly specific enzyme uricase specifically to destroy the uric acid in serum or urine. Early techniques consisted of precipitating the protein in a test and blank, then applying the usual color reaction to two samples, one of which has been treated with uricase enzyme, thus destroying the uric acid in that sample, the difference in the amount of observed color being presumed to be due to uric acid.

However, criticisms of uricase methods combined with color reaction, caused in the prior art the virtual abandonment of assays using uricase with a color reaction.

Henry[5], in his widely used textbook on clinical chemistry, accepts and asserts those criticisms as destroying the reliability of the uricase method procedures in colorimetric analysis.

Such criticism included that of Bien[6] in 1950 (as to non-correct consideration of glucose effect) and of Yu in 1949[7] and again in 1959[8] (as to non-correct consideration of gentisic acid effect) as are cited by the widely respected authority Henry in 1964.

Henry, in commenting as to the glucose effect, cites Bien and asserts that "the great specificity of an enzyme may lead to a false sense of security in such a technic is evidenced by the reports that glucose in the presence of uric acid reduces arsenophosphotungstic acid to a much greater extent than glucose alone ... "

In other words, although one might think that the glucose effect could be ignored as being similar in both a uricase-treated specimen and a non-uricase-treated specimen, the respected authority Henry specifically teaches that the glucose does not react the same in the non-uricase-treated specimen as it does in the uricase-treated specimen; and, therefore, asserts Henry, the glucose cannot be ignored and the test does not have the expected accuracy, and cannot therefore be expected to be reliable.

Henry, moreover, cites the Yu references and asserts that "gentisic acid, a metabolic excretory product of acetylsalicylic acid, reacts in the arsenophosphotungstate-cyanide reaction and is destroyed by the alkalinity existing in uricase treatment." Thus, somewhat similar to his criticism as to the unreliability due to the glucose effect, Henry specifically teaches that the gentisic acid effect cannot be ignored, and thus the test for that further reason does not have the expected accuracy.

Such reports have caused the combination of uricase with a color reaction to be virtually wholly abandoned.

In 1947 Kalckar[9] introduced the technique of a uricase enzyme reaction in conjunction with the use of differential spectrophotometry for the determination of uric acid. This type assay involves the fact that uric acid has an absorbence peak in the region of 290 to 293 mu whereas the end product after destruction of uric acid by uricase has no absorption at this wavelength. While this method is relatively specific for uric acid, it has practical and economic disadvantages, for it requires special ultra-violet instrumentation and quartz or comparable glassware for measurement, and it is therefore not routinely used in hospital laboratories.

The use of the enzyme uricase either with ultra-violet measurement or the usual color measurement has thus not met its goals or it is too unwieldy when it does.

Furthermore, the prior art methods using uricase treatment in combination with the usual phosphotungstate color reaction retained the use of the protein removal step and were thus more complicated, not less complicated, than the usual methods.

Thus, methods using the phosphotungstate reaction such as the 1930 Folin method and subsequent modifications, but without enzyme treatment, are still in wide use in spite of the fact that they are subject to error as are caused by the interfering factors indicated above.

(A number of methods which attempt specificity, but without treatment by uricase enzyme, have been proposed but have not been found successful and not adopted. These include a variety of other color reagents, pre-treatment of the sample with strong alkali and preliminary isolation of uric acid on an ion-exchange resin).

THE PRESENT INVENTION

In the present invention, serum is treated in a "blank" specimen of serum with a buffer containing the enzyme uricase, and a "test" specimen of serum is treated with the same buffer in the absence of uricase. A color reaction is then performed to develop color from uric acid which remains in the "test" specimen. Interfering substances such as glutathione, glucose, ascorbic acid, caffeine, phenols, etc., which interfere in most methods employing color-forming reaction form color in both the "test" and "blank," and their effect is negated by subtraction or subtraction in effect, thereby providing a specific assay for uric acid itself.

The cumbersome protein-removal step used in the prior art methods due to the fact that the protein contributes color which is mistaken for uric acid or tends to produce turbidity which makes accurate spectrophotometric measurement impossible, is omitted in the present invention. Turbidity which had been eliminated in the prior art by protein removal is eliminated in the present invention by the use of urea, and the contribution of the protein to the final color is corrected since it exists equally in "test" and "blank." If urea is excluded from the reagent, gross turbidity results upon addition of the reagents to the specimen being assayed.

The prior art teaches that glucose, which always exists in serum, reduces phosphotungstate producing a color in the presence of uric acid to a much greater extent than when glucose exists alone. Thus one would expect that when uric acid is destroyed as is done by the uricase in the "blank" in this invention, the glucose which was introduced with the serum would reduce the phosphotungstic acid less in the "blank" than it does in the "test" wherein the glucose exists with uric acid. One would then expect glucose to interfere when combining uricase treatment with the phosphotungstate reaction, thus invalidating any attempt to use uricase to obtain specificity unless the glucose were removed from the test and blank. According to the prior art, when the uric acid is removed there may be produced a corresponding and contrasting increase of glucose effect in the comparison sample or specimen containing the uric acid in comparison to the sample or specimen in which the uric acid has been destroyed.

It may be concluded from Henry's reference to Bien as cited above, that uric acid accentuates the color-forming character of the glucose, and thus that removal of the uric acid by uricase or by whatever other means, even by technology not yet considered, would yield less color imparted by the glucose.

However, in the present invention the serum is treated in the "test" with the buffer used to suspend the uricase enzyme used in the "blank"; and the glucose reduces phosphotungstate to the same degree in both "test" and "blank" and therefore causes no interference at all glucose levels encountered in assaying serum, even in high glucose levels found in pathologic sera.

Moreover, by adding the buffer to both "test" and "blank," the error-producing gentistic acid effect of the prior art's attempted uricase assay which was criticised as above by the Henry reference, is negated by causing the gentisic acid effect to be the same in both "test" and "blank."

ILLUSTRATIVE EMBODIMENTS

Buffer: to 800 ml of distilled water is added 9.8 grams of propanediol, 5.3 grams of sodium chloride, 5.0 grams of tetrasodium EDTA, and 6.2 grams of boric acid. Mix to dissolve. Adjust the volume to 1 liter with water. Adjust to pH 9.0 ± 0.05 with concentrated HCl or 10 normal sodium hydroxide.

Carbonate reagent: 100 grams of anhydrous sodium carbonate, 200 grams of urea, and 5 grams of tetrasodium EDTA are added with mixing to enough water to give a final volume of 1 liter.

Uricase enzyme: Specific activity 25 International units per milligram.

Phosphotungstic acid reagent: Dissolve 40 g molybdenum-free sodium tungstate in about 300 ml distilled water. Add 32 ml 85% orthophosphoric acid. Reflux gently for 2 hours. Cool to room temperature and make to 1 l. with distilled water. Mix. Dissolve 32 g. $Li_2SO_4 \cdot H_2O$ in reagent.

Buffered uricase solution: Add uricase above to buffer above to give a solution containing 0.1 international unit of uricase per milliliter.

Procedure: Two 12 × 75 mm test tubes are used. One is labeled "test," the other "blank." Into the "blank" tube add 0.2 ml buffered uricase. Into the "test" tube add 0.2 ml buffer. Add 0.1 ml of serum to both tubes. Mix and incubate for 10 minutes at 37°–45° centigrade. Add 1.0 ml carbonate reagent to both tubes. Mix. Add 1.0 ml phosphotungstic acid reagent to both tubes. Mix. Allow to stand for 5 minutes and read absorbence of the "test" against the absorbence of the "blank" at 650 NM on a spectrophotometer with a 1 CM curvette. Compare absorbence to a standard curved prepared by performing the above procedure on known solutions of uric acid.

SUMMARY

An assay according to the present invention thus provides an advantageous and effective assay for uric acid in which uricase enzyme is used in a colorimetric determination, avoiding the bother and expense of protein-precipitation steps and other steps or other disadvantages of prior uric acid assays.

The present invention provides a simple assay which requires no equipment which is not generally available in hospital laboratories and which does not measure interfering substances such as glutathione, glucose, ascorbic acid, caffeine, phenols, etc.

This combination of desirable features, including utility, accuracy, labor and time savings, has not been achieved by the prior art methodology.

Accordingly, it will thus be seen from the foregoing description of the invention as set forth herein, that the present invention provides a new and useful assay, using uricase enzyme, yielding a colorimetric determination of uric acid, and reagents for such assay, having and attaining desired advantages and characteristics, and accomplishing the objects of the invention, including those hereinbefore pointed out and others which are inherent in the invention.

It will be understood that modifications and variations of the general and specific concepts of the overall assay may be effected without departing from the scope of the novel concepts of this invention; accordingly, the invention is not to be considered limited to the specific form or embodiments set forth herein for the purpose of disclosing and illustrating the inventive concepts.

For instance, the specific activity of the uricase used should desirably be such that the contribution of the protein contained therein is not so high as to yield an absorbence of more than that given by 1 mg % of uric acid in the "test," and should be of high enough activity to completely destroy the uric acid in the "blank" tube in the length of time chosen for the incubation. In general, the highest specific activity of enzyme attainable which is consistent with economical use is the most desirable. The spectrophotometric observation may be made at any wave length from 600 to 800 NM. Likewise the reagent systems may be used in automated systems using standard techniques of adapting manual methods to automated devices.

REFERENCE NOTES

1. Offer, T. R., Centr. Physiol. 8:801 (1894), as cited in Henry, Richard J., M.D., *Clinical Chemistry Principles and Techniques* (Harper & Row, 1967) p. 276.
2. Benedict, S. R., J. Biol. Chem. 51:187 (1922), as cited in Henry, supra, p. 276.
3. Folin, O., J. Biol. Chem. 86:179 (1930), as cited in Henry, supra, p. 276.
4. Bulger, H. A., and H. E. Johns, J. Biol. Chem. 140:427 (1941), as cited in Henry, supra, p. 277.
5. Henry, supra, p. 277 ff.
6. Bien, E. J., and W. Troll, Proc. Soc. Exp. Biol. Med. 73:370 (1950), as cited in Henry, supra, p. 278.
7. Yu, T. F., and A. B. Gutman, Federation Proc. 8:267 (1949), as cited in Henry, supra, p. 278.
8. Yu, T. F., and A. B. Gutman, J. Clin. Invest. 38:1298 (1959), as cited in Henry, supra, p. 278.
9. Kalckar, H. M., J. Biol. Chem. 167:429 (1947), as cited in Henry, supra, p. 278.

What is claimed is:

1. A colorimetric assay for uric acid in which color is developed as a result of the reducing effect of uric acid, and utilizing a "blank" specimen and a "test" specimen and a comparison thereof, in which uricase enzyme is suspended in the blank specimen by a buffer and is therein used to eliminate the uric acid in the blank specimen, and without protein-precipitation of either the blank or the test specimens;

in which there is provided, in the test specimen, substantially the same buffer which is employed to suspend the uricase enzyme used in the blank specimen, the buffer in the test specimen being in substantially the same amount and concentration as the buffer in the blank specimen, thereby allowing subtraction or effective subtraction of the color which is produed in the assay of the blank specimen, from the color which is produced in the test specimen, thereby increasing specificity of the assay for uric acid.

2. The invention as set forth in claim 1 in a combination in which urea is used to eliminate turbidity of both the blank specimen and test specimen.

3. The invention as set forth in claim 1 in a combination in which the buffer contains borate.

4. The invention as set forth in claim 1 in which the color-producing reducing effect is measured by an alkaline phosphotungstic acid reagent system.

* * * * *

Dedication 3,801,466.—*Jerry W. Denney*, Carmel, Ind. URIC ACID ASSAY AND REAGENTS THEREFOR. Patent dated Apr. 2, 1974. Dedication filed Feb. 25, 1982, by the assignee, *American Monitor Corp.*

Hereby dedicates to the Public the entire term of said patent.

[*Official Gazette September 14, 1982.*]

Dedication 3,801,466.—*Jerry W. Denney*, Carmel, Ind. URIC ACID ASSAY AND RE-
AGENTS THEREFOR. Patent dated Apr. 2, 1974. Dedication filed
Feb. 25, 1982, by the assignee, *American Monitor Corp.*

Hereby dedicates to the Public the entire term of said patent.
[*Official Gazette September 28, 1982.*]